United States Patent
Berggren et al.

(10) Patent No.: US 11,290,981 B2
(45) Date of Patent: Mar. 29, 2022

(54) COMBINED WAKE-UP SIGNAL FOR MULTIPLE PAGING OCCASIONS

(71) Applicant: Sony Corporation, Tokyo (JP)

(72) Inventors: Anders Berggren, Lund (SE); Basuki Priyanto, Lund (SE); Nafiseh Mazloum, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/761,045

(22) PCT Filed: Nov. 5, 2018

(86) PCT No.: PCT/EP2018/080186
§ 371 (c)(1),
(2) Date: May 1, 2020

(87) PCT Pub. No.: WO2019/086674
PCT Pub. Date: May 9, 2019

(65) Prior Publication Data
US 2020/0367194 A1    Nov. 19, 2020

(30) Foreign Application Priority Data
Nov. 3, 2017  (SE) .................................... 1730303-3

(51) Int. Cl.
*H04W 68/00* (2009.01)
*H04W 52/02* (2009.01)
(52) U.S. Cl.
CPC ..... *H04W 68/005* (2013.01); *H04W 52/0216* (2013.01); *H04W 52/0219* (2013.01); *H04W 52/0229* (2013.01)

(58) Field of Classification Search
CPC ........... H04W 68/005; H04W 52/0216; H04W 52/0219; H04W 52/0229
USPC ................... 455/458, 466, 422.1, 418, 414.1
See application file for complete search history.

(56) References Cited

U.S. PATENT DOCUMENTS

| 9,622,211 | B2* | 4/2017 | Susitaival ............. H04W 68/02 |
| 9,668,235 | B2* | 5/2017 | Zhang ................. H04W 68/005 |
| 9,794,873 | B2* | 10/2017 | Lindoff ................. H04W 56/00 |
| 2008/0182596 | A1 | 7/2008 | Wang et al. |
| 2010/0214969 | A1* | 8/2010 | Lamm ............... H04W 52/0216 370/311 |
| 2012/0275366 | A1* | 11/2012 | Anderson ........... H04W 68/025 370/311 |

(Continued)

FOREIGN PATENT DOCUMENTS

| JP | 2020501431 A | 1/2020 |
| WO | 2018174635 A1 | 9/2018 |

OTHER PUBLICATIONS

International Search Report and Written Opinion from corresponding International Application No. PCT/EP2018/080186, dated Dec. 13, 2018, 11 pages.

(Continued)

*Primary Examiner* — Nghi H Ly
(74) *Attorney, Agent, or Firm* — Tucker Ellis LLP

(57) ABSTRACT

A wake-up signal (700-706) is associated with a plurality of paging occasions (4901-4904) for a plurality of terminals (102, 102-1-102-8). Each one of the plurality of paging occasions (4901-4904) is associated with one or more of the plurality of terminals (102, 102-1-102-8).

15 Claims, 13 Drawing Sheets

(56) References Cited

U.S. PATENT DOCUMENTS

2017/0208545 A1* 7/2017 Siann .................. H04W 68/02
2017/0359801 A1* 12/2017 Chen .................... H04W 4/70

OTHER PUBLICATIONS

Intel Corporation: "WUS consideration for efeMTC", 3GPP R2-1710641, Retrieved on Oct. 8, 2017, 7 pages.
Intel Corporation: "Configurations of wake-up signal for feNB-IoT", 3GPP R1-1717344, Retrieved on Sep. 30, 2017, 4 pages.
Office Action from corresponding Japanese Application No. 2020-524487, dated May 11, 2021, 16 pages.
Huawei, HiSilicon, "On 'wake-up signal' for eFeMTC", 3rd Generation Partnership Project (3GPP), Oct. 9-13, 2017, Prague, Czech Republic, R1-1716970, 8 pages.
Huawei, HiSilicon, "On configurations and procedures of power saving signal", 3rd Generation Partnership Project (3GPP), Oct. 9-13, 2017, Prague, Czech Republic, R1-1716985, 7 pages.
LG Electronics, "Discussion on wake up signal and wake up channel for NB-IoT", 3rd Generation Partnership Project (3GPP), Aug. 21-25, 2017, Prague, Czech Republic, R1-1713100, 13 pages.
Office Action from corresponding European Application No. 18799707.7 dated Aug. 2, 2021.

* cited by examiner

COMBINED WAKE-UP SIGNAL FOR MULTIPLE PAGING OCCASIONS

TECHNICAL FIELD

Various examples of the invention generally relate to communicating wake-up signals. Various examples specifically relate to communicating wake-up signals associated with a plurality of paging occasions for a plurality of terminals.

BACKGROUND

Wireless communication is an integral part of modern life. Reducing energy consumption of wireless communication is an important task to enable various applications such as Internet of Things (IOT) or Machine Type Communication (MTC).

One approach to reduce the energy consumption of wireless communication is to use wake-up techniques. Here, a terminal/user equipment (UE) may include two receivers, i.e., one main receiver and a low-power receiver. The low-power receiver may implement a comparably simple architecture and, therefore, may consume less power during operation than the main receiver. The low-power receiver can be activated when the main receiver has transitioned into an inactive state. Then, the low-power receiver can receive the wake-up signal (WUS) and, in response to receiving the WUS, the main receiver can transition again to the active state. Payload data may be transmitted and/or received (communicated) by the main receiver.

Example implementations are described by Third Generation Partnership Project (3GPP) TSG RAN Meeting #74 contribution RP-162286 "Motivation for New WI on Even further enhanced MTC for LTE"; 3GPP TSG RAN Meeting #74 contribution RP-162126 "Enhancements for Rel-15 eMTC/NB-IoT"; and 3GPP TSG RAN WG1#88 R1-1703139 "Wake Up Radio for NR". See 3GPP R2-1708285.

The WUS is to be sent prior to a paging indicator. The paging indicator is transmitted on a paging control channel. The UE listens for signals on the paging control channel, if a WUS is detected. The WUS is related to the UE such that the UE can identify the entity to which the WUS is directed.

Such techniques face certain restrictions and drawbacks. For example, with a growing number of UEs connecting to a network—specifically in the IOT framework—the control signaling overhead due to WUS signaling is expected to increase.

SUMMARY

Therefore, a need exists for advanced wake-up techniques. In particular, a need exists which overcomes or mitigates at least some of the above-identified drawbacks and restrictions.

This need is met by the features of the independent claims. The dependent claims define embodiments.

This need is met by the features of the independent claims. The features of the dependent claims define embodiments.

A method of operating a terminal comprises receiving a WUS associated with a plurality of paging occasions. The plurality of paging occasions may be for a plurality of terminals. For example, each one of the plurality of paging occasions may be associated with one or more of the plurality of terminals. The method also comprises, in response to said receiving of the WUS: listening for a paging signal at at least one paging occasion of the plurality of paging occasions.

A computer program product or a computer program comprises program code to be executed by a control circuitry. Executing the program code causes the control circuitry to perform a method of operating a terminal. The method comprises receiving a WUS that may be associated with a plurality of paging occasions for a plurality of terminals. Each one of the plurality of paging occasions may be associated with one or more of the plurality of terminals. The method also comprises, in response to said receiving of the WUS: listening for a paging signal at at least one paging occasion of the plurality of paging occasions.

A terminal comprises control circuitry configured to receive a WUS associated with a plurality of paging occasions for a plurality of terminals. Each one of the plurality of paging occasions may be associated with one or more of a plurality of terminals. The control circuitry is also configured to listen for a paging signal at at least one paging occasion of the plurality of paging occasions in response to said receiving of the WUS.

A method of operating a base station comprises transmitting a WUS associated with a plurality of paging occasions for a plurality of terminals. Each one of the plurality of paging occasions is associated with one or more of the plurality of terminals. The method also comprises transmitting at least one paging signal on at least one of the plurality of paging occasions for at least one of the plurality of terminals.

A computer program product or a computer program comprises program code to be executed by a control circuitry. Executing the program code causes the control circuitry to perform a method of operating a base station. The method comprises transmitting a WUS associated with a plurality of paging occasions for a plurality of terminals. Each one of the plurality of paging occasions is associated with one or more of the plurality of terminals. The method also comprises transmitting at least one paging signal on at least one of the plurality of paging occasions for at least one of the plurality of terminals.

A base station comprising control circuitry configured to transmit a WUS associated with a plurality of paging occasions for a plurality of terminals. Each one of the plurality of paging occasions is associated with one or more of the plurality of terminals. The control circuitry is also configured to transmit at least one paging signal on at least one of the plurality of paging occasions for at least one of the plurality of terminals.

In the examples described above and hereinafter, it may be possible that different ones of the plurality of paging occasions are at least partly associated with different terminals. Hence, paging may be at least partly different from paging occasion to paging occasion. In other examples, it would be possible that different ones of the plurality of paging occasions are associated with the same terminal. In other words, there can be a 1-to-N mapping, from a UE perspective, between the WUS and paging occasions.

In the examples described above and hereinafter, it may be possible to use distinct or separate paging occasions. Hence, different paging occasions may be different from each other in at least one of their position time domain, their position in code domain, and their position in frequency domain.

By such techniques it is possible to implement wake-up techniques using reduced signaling overhead. Specifically, by providing a single WUS which is associated with a plurality of paging occasions, the overall control signaling to address the multiple paging occasions can be reduced.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
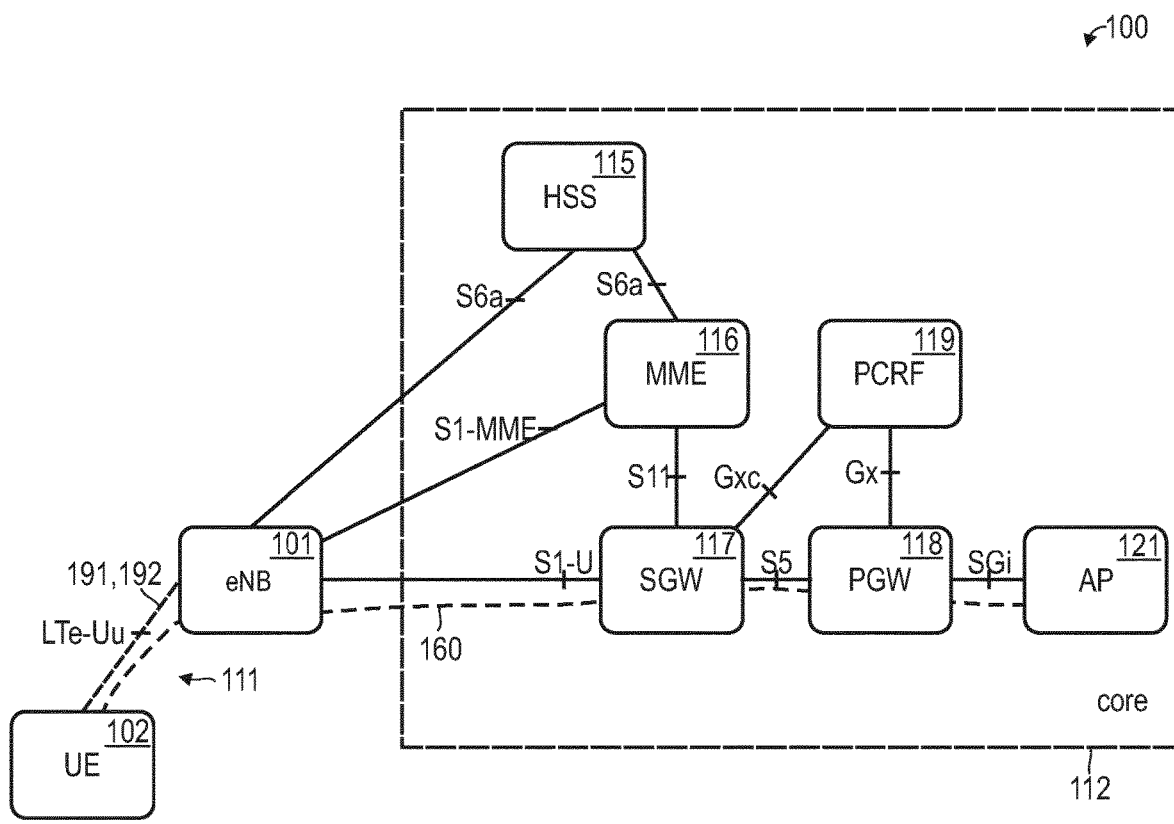
FIG. 1 schematically illustrates a network including a core network and a radio access network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, wake-up techniques are described. The wake-up techniques enable a UE to transition a main receiver into a low-power state, e.g., for power-saving purposes. In some examples, the low-power state of the main receiver may be an inactive state.

The inactive state can be characterized by a significantly reduced power consumption if compared to an active state of the main receiver. For example, the main receiver may be unfit to receive any data in the inactive state such that some or all components may be shut down. Wake-up of the main receiver from the inactive state is then triggered by a WUS.

The WUS may be received by a dedicated low-power receiver of the UE. The WUS may have a comparably simple modulation, e.g., On-Off Keying or the like, which facilitates a simple time-domain operation by the low-power receiver. For example, non-coherent decoding may be possible. For non-coherent decoding, knowledge of a reference phase is not required for signal detection. In other examples, the WUS may be received by the main receiver in the low-power state. Here, it may not be required to provision a dedicated low-power receiver.

The low-power receiver and main receiver may be implemented within the same hardware component(s) or may be implemented by at least one different hardware component.

The WUS may help to avoid blind decoding of a control channel on which paging signals and/or paging messages are communicated. Since typically such blind decoding is comparably energy inefficient, thereby, power consumption can be reduced by using WUSs. This is explained in greater detail hereinafter: For example, in the 3GPP scenario, during paging occasions (POs), the UE is expected to blind decode the control channels MPDCCH (for Machine Type Communication) or PDCCH (for LTE) or NPDCCH (for NB-IOT) for P-RNTI as UE identity. If presence of a paging indicator including the P-RNTI is detected, the UE continues to decode a subsequent PDSCH for a paging message. However, the paging message on PDSCH may be indicative of paging of other UEs, and not for the given UE. In this case, the given UE needs to go back to sleep until the next PO. Moreover, in applications where the paging rate is very low, the cost of UE idle listening can become very high relatively. Under this condition, the UE needs to monitor the control channel without receiving any paging indication. In Machine Type Communications (MTC), it could be even worse as the respective MPDCCH control channel is transmitted with the highest number of repetitions which reflect the maximum extended coverage used in that cell. By provisioning the WUS in a UE-related manner, the UE may be aware of the potential of subsequent paging without a need of blindly decoding paging signals. This reduces power consumption.

However, such reference implementations face the problem that for multiple POs, multiple WUS are required to address the multiple UEs associated with the multiple POs. This may result in significant control signaling overhead.

Hereinafter, techniques are described which facilitate addressing a plurality of UEs through WUS techniques. The techniques described herein facilitate wake-up of the plurality of UEs with reduced control signaling overhead.

According to certain examples, this is achieved by provisioning multiple POs per WUS. Hence, it is possible that the WUS is associated with a plurality of POs. In other words, the WUS can control one or more UEs to listen for paging signals on the plurality of POs. Thus, the WUS addresses multiple POs—and, thereby, paging of multiple UEs. This avoids a need for communicating one WUS per PO; and, thereby, reduces control signaling overhead.

As such, according to examples, a set of UEs may be grouped together to share a WUS. Multiple UEs can be indicated to wake up or go to sleep using the same WUS, even if the multiple UEs do not share the same PO.

Each individual UE may be redundantly paged at multiple POs.

FIG. 1 illustrates aspects with respect to a network 100. Such a network 100 may be employed in the various examples disclosed herein, e.g., for communicating WUSs. FIG. 1 illustrates aspects with respect to the architecture of the network 100. The network 100 according to the example of FIG. 1 implements the 3GPP LTE architecture.

The illustration of the network 100 in FIG. 1 in the 3GPP LTE framework is for exemplary purposes only. Similar techniques can be readily applied to various kinds of 3GPP-specified architectures. For example, the techniques described herein may be applied to the 3GPP eNB-IoT or MTC systems or 3GPP New Radio (NR) systems, sometimes also referred to as 5G. See, for example, 3GPP RP-161321 and RP-161324. Furthermore, respective techniques may be readily applied to various kinds of non-3GPP-specified networks, such as Bluetooth, satellite networks, IEEE 802.11x Wi-Fi technology, etc.

The network 100 includes a radio access network (RAN) formed by a BS 101. A UE 102 is connected to the network via the BS 101. A wireless link 111 is defined between the UE 102 and the BS 101.

The network 100 includes a core network (CN) 112. The CN 112—the evolved packet core (EPC) in 3GPP LTE—is in communication with the RAN. The CN 112 includes a control layer and a data layer. The control layer includes control nodes such as the home subscriber server (HSS) 115, the mobile management entity (MME) 116, and the policy and charging rules function (PCRF) 119. The data layer includes gateway nodes such as the serving gateway (SGW) 117 and the packet data network gateway (PGW) 118.

For example, the MME 116 controls CN-initiated paging of the UEs 102 if the respective UE 102 operates in RRC idle mode. The MME 116 may keep track of the timing of a discontinuous reception (DRX) cycle of the UE 102. For example, the MME 116 may be part of establishing a data connection 160. The MME 116 may trigger transmission of WUSs and/or of paging signals by the BS 101.

The data connection 160 is established if the respective UE 102 operates in RRC connected mode. To keep track of the current state of the UEs 102, the MME 116 sets the UE 102 to ECM connected or ECM idle. During ECM connected, a non-access stratum (NAS) connection is maintained between the UE 102 and the MME 116. The NAS connection implements an example of a mobility control connection.

The general functioning and purpose of the network nodes 115-119, 121 of the CN 112 is well known in the art such that a detailed description is not required in this context.

Figure 2:
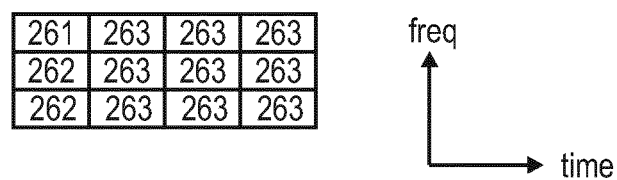
FIG. 2 schematically illustrates resource allocation for multiple channels according to various examples.

The data connection 160 is established between the UE 102 via the RAN and the data layer of the CN 112 and towards an access point 121. For example, a connection with the Internet or another packet data network can be established via the access point 121. To establish the data connection 160, it is possible that the respective UE 102 performs a random access (RACH) procedure, e.g., in response to reception of network paging and, optionally, a preceding WUS. A server of the packet data network or the Internet may host a service for which payload data is communicated via the data connection 160. The data connection 160 may include one or more bearers such as a dedicated bearer or a default bearer. The data connection 160 may be defined on the RRC layer, e.g., generally Layer 3 of the OSI model of Layer 2. Establishing of the data connection 160 may thus include OSI Network layer control signaling. By means of the data connection 160, time-frequency resources may be allocated on payload channels such as the Physical UL Shared Channel (PUSCH) and/or the Physical DL Shared Channel (PDSCH) to facilitate transmission of payload data. A control channel such as the Physical DL Control Channel (PDCCH) can facilitate transmission of control data. Also a Physical UL Control Channel (PUCCH) can be implemented. FIG. 2 illustrates time-frequency resources allocated to different communication channels 261-263 in a time-frequency grid.

FIG. 2 illustrates aspects with respect to channels 261-263 implemented on the wireless link 111. The wireless link 111 implements a plurality of communication channels 261-263. Transmission frames—e.g., implemented by radio frames, each including one or more subframes—of the channels 261-263 occupy a certain time duration. Each channel 261—263 includes a plurality of resources which are defined in time domain and frequency domain. For example, the resources may be defined with respect to symbols encoded and modulated according to Orthogonal Frequency Division Multiplexing (OFDM). The resources may be defined in a time-frequency resource grid.

For example, a first channel 261 may carry WUSs. The WUSs enable the network 100—e.g., the MME 116—to page the UE 102 when the UE 102 is in a respective idle mode. The WUSs may thus be communicated in dedicated resources of the channel 261.

A second channel 262 may carry paging signals or paging indicators which enable the network 100—e.g., the MME 116—to page the UE 102 when the UE 102 is in a respective idle mode. The paging signals or paging indicators may thus be communicated in dedicated resources of the channel 262. Typically, the paging indicators are communicated on PDCCH.

As will be appreciated from the above, the WUSs and the paging signals may be different from each other in that they are transmitted on different channels 261, 262. Different resources may be allocated to the different channels 261-263.

Further, a third channel 263 is associated with a payload messages carrying higher-layer user-plane data packets associated with a given service implemented by the UE 102 and the BS 101 (payload channel 263). User-data messages may be transmitted via the payload channel 263. According to the E-UTRAN RAT, the payload channel 263 may be the PDSCH or the PUSCH. Alternatively, control messages may be transmitted via the channel 263, e.g., a paging message.

Figure 3:
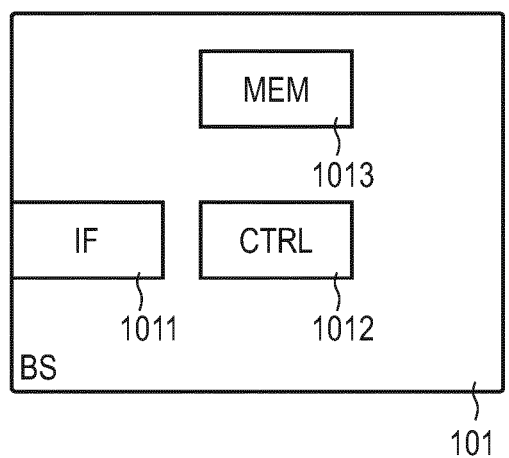
FIG. 3 schematically illustrates a BS of the radio access network according to various examples.

FIG. 3 schematically illustrates the BS 101. The BS 101 includes an interface 1011. For example, the interface 1011 may include an analog front end and a digital front end. The BS 101 further includes control circuitry 1012, e.g., implemented by means of one or more processors and software. For example, program code to be executed by the control circuitry 1012 may be stored in a non-volatile memory 1013. In the various examples disclosed herein, various functionality may be implemented by the control circuitry 1012, e.g.: transmitting WUSs; generating WUS being associated with a plurality of POs for a plurality of UEs; etc.

Figure 4:
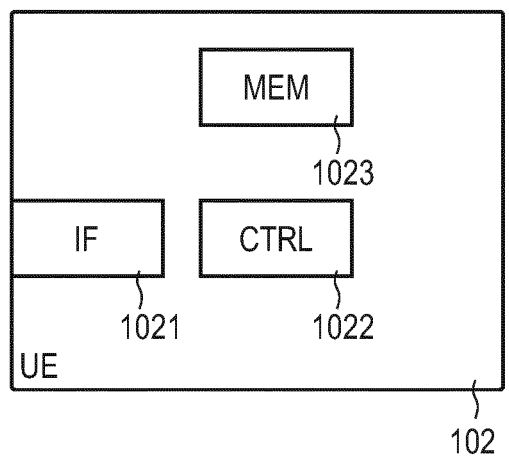
FIG. 4 schematically illustrates a UE connectable to the network via the BS according to various examples.

FIG. 4 schematically illustrates the UE 102. The UE 102 includes an interface 1021. For example, the interface 1021 may include an analog front end and a digital front end. In some examples, the interface 1021 may include a main receiver and a low-power receiver. Each one of the main receiver and the low-power receiver may include an analog front end and a digital front end, respectively. The UE 102 further includes control circuitry 1022, e.g., implemented by means of one or more processors and software. The control circuitry 1022 may also be at least partly implemented in hardware. For example, program code to be executed by the control circuitry 1022 may be stored in a non-volatile memory 1023. In the various examples disclosed herein, various functionality may be implemented by the control circuitry 1022, e.g.: receiving WUSs; transitioning the main receiver between an inactive state and an active state; implementing a DRX cycle of the main receiver and/or of the low-power receiver; identifying a PO based on the WUS; etc.

Figure 5:
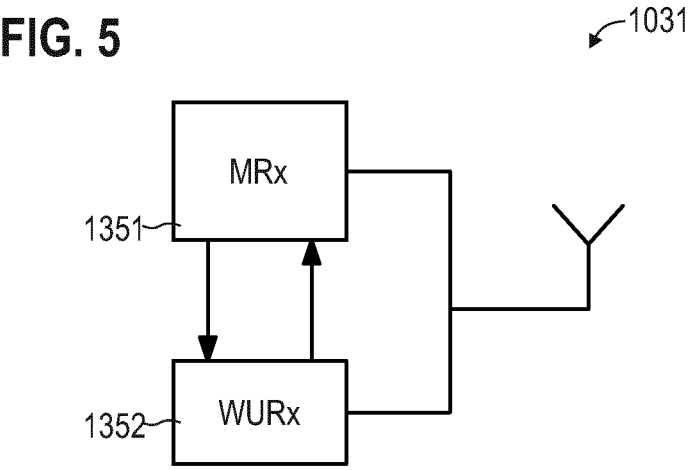
FIG. 5 schematically illustrates receivers of the UE according to various examples.

FIG. 5 illustrates details with respect to the interface 1031 of the UE 102. In particular, FIG. 5 illustrates aspects with respect to a main receiver 1351 and a low-power receiver 1352. In FIG. 5, the main receiver 1351 and the low-power receiver 1352 are implemented as separate entities. For example, they may be implemented on different chips. For example, they may be implemented in different housings. For example, they may not share a common power supply.

The scenario FIG. 5 may enable switching off some or all components of the main receiver 1351 when operating the main receiver in inactive state. In the various examples described herein, it may then be possible to receive WUSs using the low-power receiver 1352. Also, the low-power receiver 1352 may be switched between an inactive state and an active state, e.g., according to a DRX cycle.

For example, if the main receiver 1351 is switched on, the low-power receiver 1352 may be switched off, and vice-versa. As such, the main receiver 1351 and the low-power receiver 1352 may be inter-related in operation (indicated by the arrows in FIG. 5).

Figure 6:
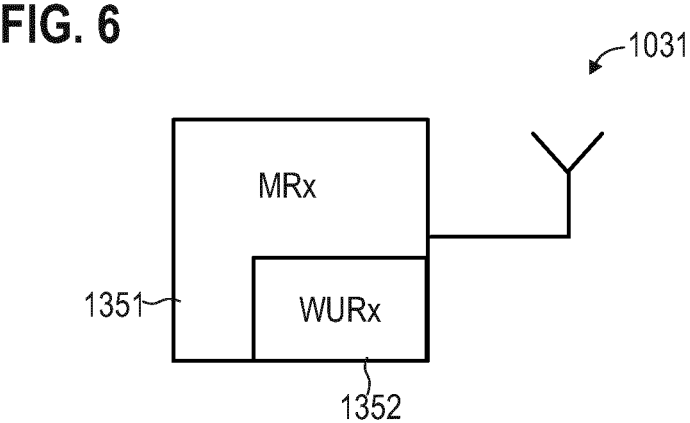
FIG. 6 schematically illustrates receivers of the UE according to various examples.

FIG. 6 illustrates details with respect to the interface 1031 of the UE 102. In particular, FIG. 6 illustrates aspects with respect to the main receiver 1351 and the low-power receiver 1352. In FIG. 6, the main receiver 1351 and the low-power receiver 1352 are implemented as a common entity. For example, they may be implemented on the common chip, i.e., integrated on a common die. For example, they may be implemented in a common housing. For example, they may share a common power supply.

The scenario FIG. 6 may enable a particular low latency for transitioning between reception—e.g., of a WUS—by the wake-up receiver 1352 and reception by the main receiver 1351.

While in FIGS. 5 and 6 a scenario is illustrated where the main receiver 1351 and the low-power receiver 1352 share a common antenna, in other examples, it would be also possible that the interface 1031 includes dedicated antennas for the main receiver 1351 and the low-power receiver 1352.

While in the examples of FIGS. 5 and 6 scenarios are illustrated where there is a dedicated low-power receiver 1352, in other examples there may be no low-power receiver. Instead, the WUS may be received by the main receiver 1351 in a low-power state. For example, the main receiver 1351 may not be fit to receive ordinary data other than the WUS in the low-power state. Then, in response to receiving the WUS, the main receiver 1351 may transition into a high-power state in which it is fit to receive the ordinary data, e.g., on PDSCH or PDCCH, etc.

Figure 7:
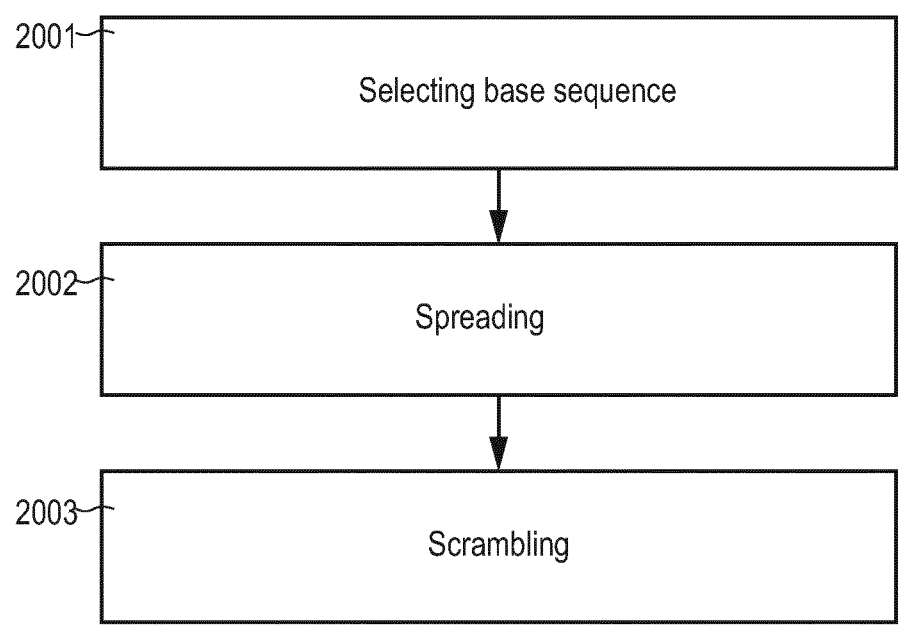
FIG. 7 schematically illustrates a method according to various examples, wherein the method is for generation of WUSs.

FIG. 7 is a flowchart of a method according to various examples. FIG. 7 illustrates aspects with respect to constructing or generating the WUS.

For example, the method according to FIG. 7 could be executed by the control circuitry 1012 of the BS 101. FIG. 7 illustrates aspects with respect to a sequence design of the WUS. In the various examples described herein, it may be possible to construct the WUSs according to the method of FIG. 7.

First, a certain base sequence is selected, 2001. For example the base sequence may be a randomly generated set of bits. For example, the base sequence may be unique for a UE or a group of UEs. For example, the base sequence may be unique for a plurality of POs selected from a plurality of candidate POs. For example, the base sequence may be unique for a cell of the network 100. For example, the base sequence may be selected from the group including: a Zadoff-Chu sequence; a sequence selected from a set of orthogonal or quasi-orthogonal sequences; and a Walsh-Hadamard sequence. For example, selecting the particular base sequence or type of base sequence can be subject to sequence design of the WUS. For example, setting the sequence length of the base sequence of the WUS can be subject to sequence design of the WUS. Selecting the base sequence can be subject to sequence design of the WUS.

In some examples, different base sequences may be selected for different WUSs. In particular, the base sequence may be selected based on an intended recipient of the WUS, i.e., depending on the particular UE 102 to which the WUS is to be transmitted. In other words, it may be possible that the base sequence is uniquely associated with the respective UE 102 as the intended recipient of the WUS. Different UEs may be addressed by different base sequences. Hence, the base sequence may also be referred to as identity code. Thereby, it may be possible to implement the WUS to be UE-related. Another possibility is to associate one base sequence with two or more UEs. Also, in such a scenario the WUS is UE-related, specifically related to a plurality of UEs. As such the WUS may be related to a group of two or more UEs.

Next, spreading may be applied to the base sequence, 2002. When spreading a bit sequence, the incoming bit sequence is spread/multiplied with a spreading sequence. This increases the length of the incoming bit sequence by a spreading factor K. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to sequence design of the WUS.

Then, scrambling may be applied to the spread base sequence, 2003. Scrambling may relate to inter-changing or transposing a sequence of the bits of the incoming bit sequence according to one or more rules. Scrambling provides for randomization of the incoming bit sequence. Based on a scrambling code, the original bit sequence can be reproduced at the receiver. Details of the scrambling can be set by a scrambling parameter. For example, the scrambling parameter can identify the one or more rules. For example, the scrambling parameter can relate to the scrambling code. Setting the scrambling parameter can be subject to sequence design of the WUS.

In some examples, it may be possible to additionally add a checksum to the WUS. Adding a checksum may be subject to sequence design of the WUS. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc.

In some examples, it may be possible to add a preamble to the WUS. The preamble may include a sequence of preamble bits. For example, the sequence of preamble bits may have a specific length. The sequence of preamble bits may enable robust identification of the WUS, e.g., even in presence of burst errors, etc. Presence of the preamble, length of the preamble, and/or type of the preamble sequence, etc. can be properties that can be set according to a preamble parameter in sequence design of the WUS.

Figure 8:
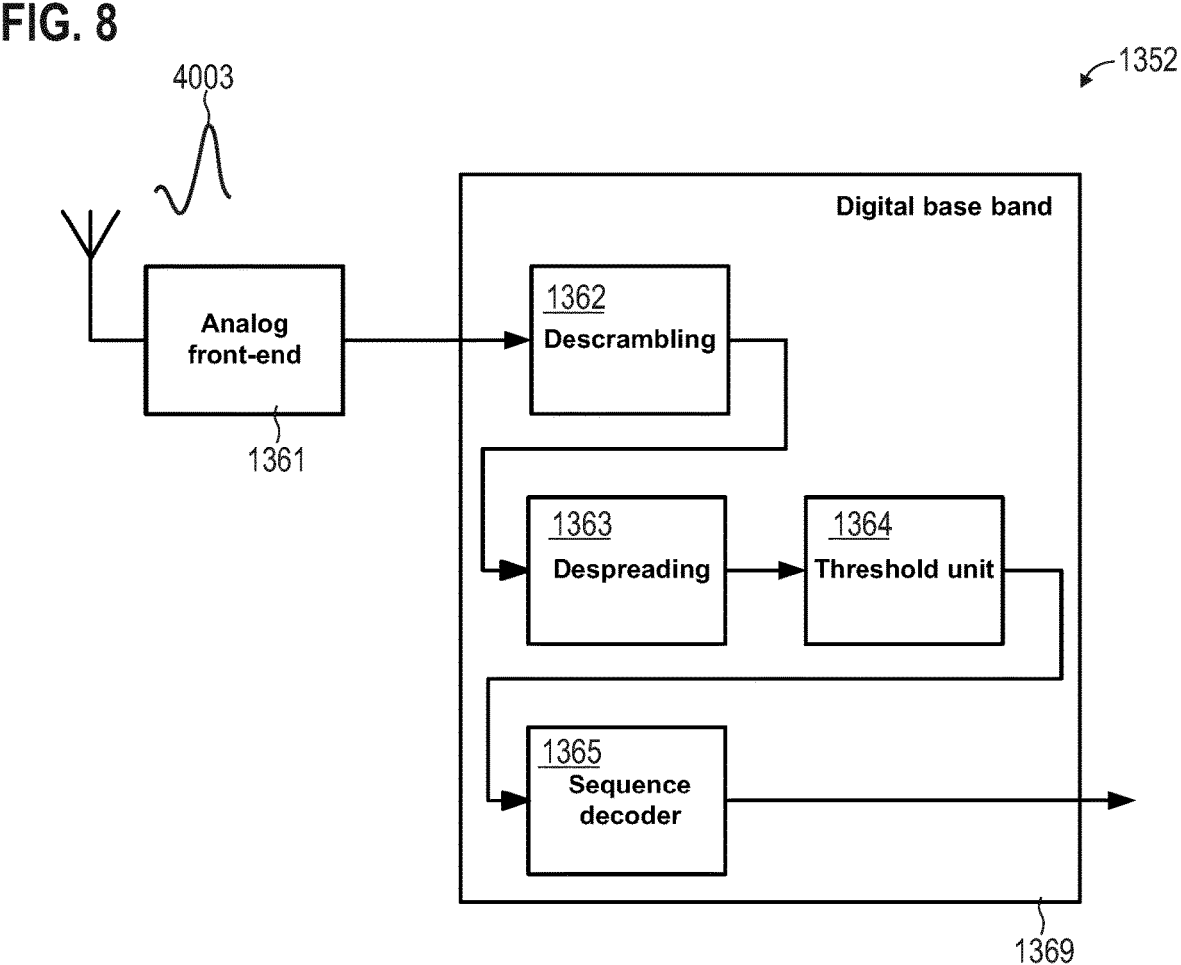
FIG. 8 schematically illustrates receiving of WUSs according to various examples.

FIG. 8 illustrates aspects with respect to the processing of a WUS 4003 received by the low-power receiver 1352. The analog front end 1361 outputs a bit sequence corresponding to the WUS 4003 in the baseband to the digital front end 1369.

In the various examples described herein, time-domain and/or frequency-domain processing is employed to identify the WUS 4003. Sometimes, respective processing may be with respect to a symbol sequence. Alternatively or additionally, respective processing may be with respect to a bit sequence. For example, processing may be with respect to a symbol sequence if the processing—e.g., correlation—is at the Fast Fourier Transform (FFT) output of the receiver. For example, processing may be with respect to a bit sequence if the processing—e.g., correlation—is after the demodulation output, e.g., after M-QAM or PSK output.

The processing of the WUS by the digital front end 1369 may be comparably simple—e.g., if compared to processing of a paging indicator. In legacy LTE, once the UE is scheduled a PO, i.e., allocated to listen to a paging indicator, the UE is expected to be ready to decode PDCCH. Thus, the paging signal may include a temporary identity such as the P-RNTI and a PDCCH checksum which is scrambled with P-RNTI. The paging indicator may be transmitted on the PDCCH. The PDCCH computation can be energy consuming, especially in MTC.

Differently, the WUS may be transmitted independent of the PDCCH. Dedicated resources may be allocated to the WUS. The WUS may be transmitted prior to the UE accessing the PDCCH. Once the UE has detected a WUS that is assigned to that UE, then the UE may start to decode the PDCCH.

The WUS and the paging signal may employ different physical channels 261, 262. The WUS may not include reference to the P-RNTI—included in the paging signal—for UE-specific identification. The WUS may be designed so that it requires less UE computation/calculation than reception and decoding of the paging signal.

For example, with respect to the WUS, it may not be preferred to have channel coding such turbo code, convolutional code, etc. The WUS can be a robust signal, such that does not operate with higher order modulation. It can be a lower order modulation, such as On-Of-Keying (OOK), BPSK. The WUS may employ a modulation scheme that has low peak to average power ratio property. The WUS can be a random bits and/or sequence signal that can be unique that can be assigned to a UE or group of UEs.

De-scrambling functionality 1362 then performs de-scrambling.

Next, de-spreading functionality 1363 is applied.

A threshold unit 1364 is provided next.

A sequence decoder 1365 employs a decoding algorithm to the bit sequence. Finally, the base sequence employed at the transmitter is thus reassembled.

It is then possible to perform a cross-correlation between the base sequence and a reference sequence. If the cross correlation yields a significant result, it can be judged that the WUS 4003 was addressed to the particular UE 102 and possibly further UEs.

Based on said cross correlating, it is then possible to selectively transition the main receiver 1351 from an inactive state to an active state.

Figure 9:
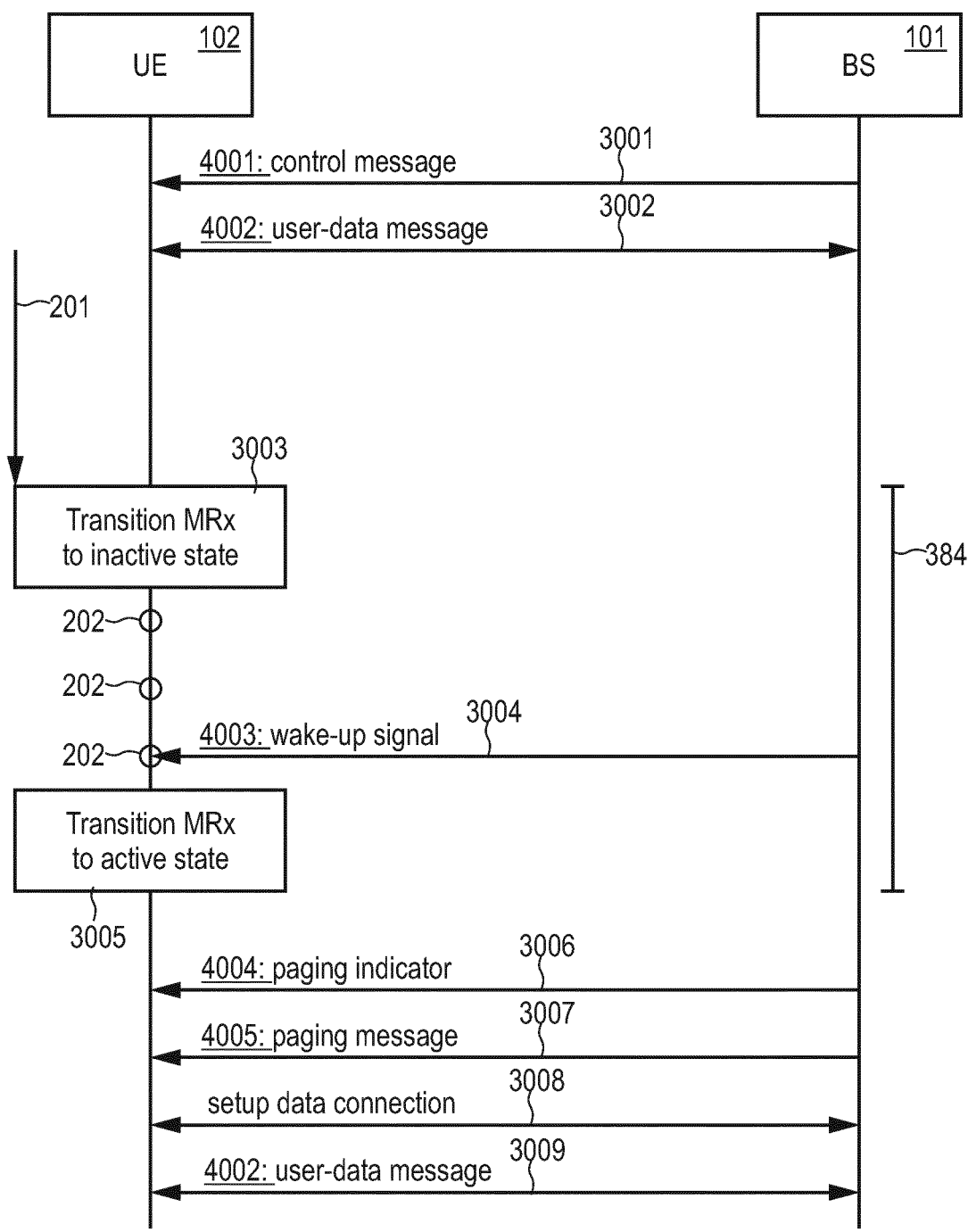
FIG. 9 is a signaling diagram of signaling between the UE and the BS according to various examples.

By means of spreading and/or scrambling of the base sequence, more reliable cross-correlation can be performed. For example, by spreading the base sequence, a longer sequence is obtained for the WUS 4003 transmitted over the air. Longer sequences generally are more robust to false positives when performing the cross-correlation. FIG. 9 is a signaling diagram. FIG. 9 illustrates aspects with respect to communicating between the UE 102 and the BS 101. FIG. 9 illustrates aspects with respect to transmitting and/or receiving (communicating) a WUS 4003. According to the various examples described herein, such techniques as described with respect to FIG. 9 may be employed for communicating WUSs 4003. In particular, FIG. 9 also illustrates aspects with respect to the inter-relationship between communication of a WUS and communication of paging signals and messages 4004, 4005 that may be employed in the various examples described herein.

At 3001, a control message 4001 is communicated. For example, the control message may be communicated on the control channel 262, e.g., PDCCH. For example, the control message may be a Layer 2 or Layer 3 control message. The control message may be relate to RRC/higher-layer signaling. For example, the control message 4001 may be broadcasted, e.g., in a system information block associated with a cell.

The control message 4001—which may be used in the various examples described herein—may be indicative of certain properties associated with the wake-up technology implemented by the UE 102. For example, the control message may configure a level of robustness of at least one part of the WUS. For example, the control message 4001 may be indicative of a modulation and/or coding scheme (MCS) employed for the WUS. For example, the control message 4001 may be indicative of a length of a base sequence of the WU. For example, the control message 4001 may be indicative of the sequence design configuration of the WUS 4003. For example, the control message 4001 may be indicative of a fixed mapping between POs and UEs; e.g., relatively defined with respect to any WUS transmission. For example, the control message 4001 may be indicative of fixed time-frequency position; e.g., relatively defined with respect to any WUS transmission. By implementing the control message 4001 to be indicative of the sequence design configuration of the WUS 4003, it is possible to dynamically adjust the sequence design configuration of the WUS 4003.

Communicating, at 3001, the control message 4001 is optionally. Generally, various properties and/or dependencies of the sequence design configuration of the WUS may be pre-configured. Then, there may be no need for explicit control signaling.

At 3002, a user-data message 4002 is communicated. For example, the user-data message 4002 may be communicated on the payload channel 263. For example, the user-data message 4002 be communicated along the data connection 160, e.g., as part of a bearer, etc.

Then, there is no more data to be communicated between the UE 102 and the BS 101. Transmit buffers are empty. This may trigger a timer. For example, the timer may be implemented at the UE 102. After a certain timeout duration set in accordance with the inactivity schedule 201, the main receiver 1351 of the UE 102 is transitioned into the inactive state 384 from the active state, 3003. This is done in order to reduce the power consumption of the UE 102. For example, prior to the transitioning the main receiver 1351 to the inactive state 384, it would be possible to release the data connection 160 by appropriate control signaling on the control channel 262 (not illustrated in FIG. 9). 4001 and 4002 are communicated with the main receiver 1351. The timeout duration 201 is an example implementation of a trigger criterion for transitioning into the inactive state 384; other trigger criteria are possible.

Multiple wake-up occasions for communicating the WUS 4003 are then implemented by reoccurring resources 202. For example, the resources 202 may be radio resources defined in a time-frequency grid used for communication with the main receiver 1951; this avoids interference with further UEs communicating with the BS 101. The wake-up occasions may be arranged in paging frames.

At some point in time, the BS 101 transmits a WUS 4003, 3004. This may be because there is DL data—e.g., payload data or control data—scheduled for transmission to the UE 102 in a transmit buffer. Another trigger criteria for transmitting the WUS 4003 are conceivable. The WUS 4003 is received by the UE 102.

In response to receiving the WUS 4003, the main receiver 1351 of the UE 102 is transitioned to the active state, 3005.

Then, at 3006, a paging indicator 4004 is transmitted by the BS 101 to the UE 102. The respective PO is associated with the wake-up occasion at which the WUS 4003 has been communicated. The paging indicator 4004 is received by the main receiver 1351. For example, the paging indicator may be transmitted on channel 262, e.g. PDCCH. For example, the paging indicator may include a temporary or static identity of the UE 102. The paging indicator or may be indicative of a plurality of UEs, because the indicator may be derived from unique identities of the UEs such as the International Mobile Subscriber Identity (IMSI) or the like in an ambiguous manner. Examples of the identity of one or more UEs that may be included in paging indicator 4004 may include a Paging Radio Network Temporary Identifier (P-RNTI) in the 3GPP LTE framework. The P-RNTI may not refer to a particular UE, but to a group of UEs. The P-RNTI may be derived from the IMSI of the subscriber to be paged and constructed by the BS.

For example, in case the WUS is already UE specific, this paging indicator may be just a control message and include Cell Radio Network Temporary Identifier (C-RNTI), e.g., instead of the P-RNTI. For example, it is possible that the paging indicator does not include a UE-related indicator, but merely includes, e.g., a cell-related indicator.

The paging indicator 4004 may also include information on a MCS used for communicating a paging message 4005 at 3007. The paging message 4005 may be communicated on a shared channel 263, e.g., PDSCH. Generally, the paging indicator 4004 and the paging message 4005 may be communicated on different channels. The paging message 4005 may be modulated and encoded according to the MCS indicated by the paging indicator 4004. Thus, it may be required that the UE 102 receives, firstly, the paging indicator 4004 and, secondly, the paging message 4005.

Then, at 3008, a data connection 160 is set up between the UE 102 and the BS 101. This may include a random access procedure and a Radio Resource Control (RRC) set up.

Finally, a UL or DL user-data message 4002 is communicated using the newly set up data connection 160 at 3009.

As will be appreciated from FIG. 9, upon transitioning the main receiver 1351 to the active state at 3005, the data connection 160 needs to be re-established. For this reason, the UE 102 operates in idle mode—when no data connection 160 is set up or maintained—during the inactive state 384 of the main receiver 1351. However, in the various examples described herein, other implementations of the particular mode in which the UE 102 operates during the inactive state 384 are conceivable.

Figure 10:
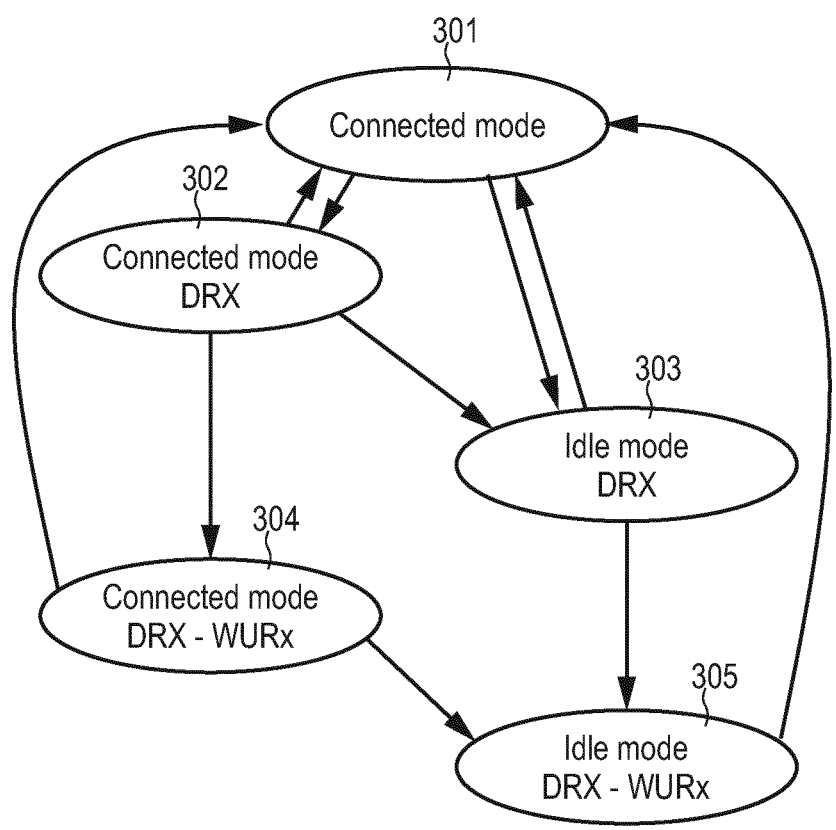
FIG. 10 schematically illustrates modes in which the UE can be operated according to various examples.

FIG. 10 illustrates aspects with respect to different modes 301—305 in which the UE 102 can operate. FIG. 10 also illustrates aspects with respect to association of communication of WUSs and paging signals with the various modes 301—305. In the various examples described herein, it is possible that the WUSs are communicated in certain operational modes 304, 305 of the UE 102.

During connected mode 301, a data connection 160 is set up. For example, a default bearer and optionally one or more dedicated bearers may be set up between the UE 102 and the network 100. In order to reduce the power consumption, it is then possible to transition from the connected mode 301 to a connected mode 302 which employs a DRX cycle of the main receiver 1351. The DRX cycle includes on durations and off durations. During the off durations, the main receiver 1351 is unfit to receive data. The timing of the DRX cycle is synchronized between the UE 102 and the BS 101 such that the BS 101 can align any DL transmission with the on durations of the connected mode DRX cycle. The bearer/data connection 160 is maintained set-up in mode 302.

To achieve a further power reduction, it is possible to implement in idle mode 303. The idle mode 303 is, again, associated with the DRX cycle of the main receiver 1351 of the UE 102. However, during the on durations of the DRX cycle in idle mode 303, the main receiver 1351 is only fit to receive paging indicators and, optionally, paging messages. For example, this may help to restrict the particular bandwidth that needs to be monitored by the main receiver 1351 during the on durations of the DRX cycles in idle mode 303. This may help to further reduce the power consumption—e.g., if compared to the connected mode 302.

In modes 301-303 the main receiver 1351 is operated in the active state. The low-power receiver 1352 is not required.

In the example of FIG. 10, two more modes 304, 305 are illustrated. Both modes 304, 305 relate to scenarios where the main receiver 1351 is operated in the inactive state 384. Hence, during the modes 304, 305, the main receiver 1351 is persistently switched off and, in particular, not switched on during any on durations. Differently, during the modes 304, 305, the low-power receiver 1352 is at least sometimes operating in an active state, e.g., according to a respective DRX cycle of the low power receiver 1352.

In mode 304, the data connection 160 is maintained between the UE 102 and the network 100. For example, respective registry entries may be maintained by the EU 102 and the network 100, e.g., at a core-network mobility node such as the MME 116. Transition into mode 304 may be determined by the inactivity schedule 201. In mode 304, it would be possible that a further signal which is communicated in response to communicating the WUS directly encodes a user-data message associated with the data connection 160. No random access procedure is required. Thus, in such an example, the data connection 160 between the network 100 and the UE 102 may be established and the WUS may then be communicated while the connection 160 is established. In such a scenario, the BS 101 may have to select between transmitting a DL scheduling grant indicative of resources allocated to a DL user-data message on the DL shared channel and transmitting the WUS, depending on the inactivity schedule 201 of the main receiver 1251. The UE 102, in mode 304, is not required to repeatedly listen for DL control information (DCI). Mode 304 offers low-latency transmission of payload data, possibly at the expense of more complicated bookkeeping, e.g., by the BS 101.

Differently, in the mode 305, the data connection 160 is not maintained between the UE 102 and the network 100. A random access procedure, triggered by paging, may be required (cf. FIG. 10).

In the example of FIG. 10, scenarios are illustrated in which both low-power receiver modes 304, 305 implement a DRX cycle of the low-power receiver 1532. Hence, the WUS 4003 is communicated in accordance with the timing of the DRX cycle. However, generally, it would also be possible to implement the modes 304, 305 such that the low-power receiver 1352 is persistently fit to receive WUSs, i.e., does not implement on durations and off durations.

Figure 11:
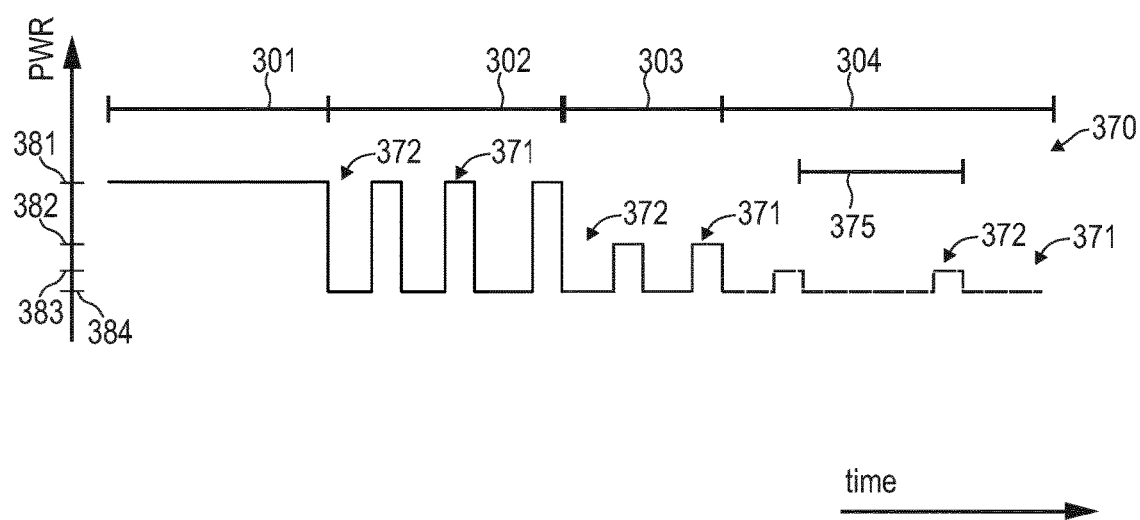
FIG. 11 schematically illustrates operation of a receiver of the UE in different states according to a discontinuous reception cycle and according to the modes according to various examples.

FIG. 11 illustrates aspects with respect to switching between the different modes 301-305. Furthermore, FIG. 11 illustrates aspects of employing DRX cycles 370. It is possible to employ such techniques in the various examples described herein with respect to communication of WUSs.

First, the UE 102 operates in the connected mode 301. This causes a persistent power consumption at a high level, because the main receiver 1351 persistently operates in the active state 381. Then, in order to reduce the power consumption, the connected mode 302 employing DRX is activated. Here, the on durations 371 and the off durations 372 of the main receiver 1351—selectively operating in the active state 381 and the inactive state 384—are illustrated.

To further reduce the power consumption, next, the idle mode 303 is activated. This is accompanied by releasing the data connection 160. Again, the idle mode 303 employs a DRX cycle including on durations 371 and off durations 372. The on durations 371 in mode 303 are associated with a lower power consumption if compared to the on durations 371 in connected mode 302, because in the idle mode 303, the capability of the main receiver 1351, now operating in the active state 382, can be reduced if compared to the connected mode 302. During idle mode 303 when in active state 382, the main receiver 1351 only expects reception of paging signals.

Finally, to even further reduce the power consumption, the idle mode 305 is activated. Upon transitioning into the idle mode 305, the main receiver 1351 is persistently transitioned from the active states 381, 382 to the inactive state 384. A DRX cycle 370 is again implemented including on durations 371 and off durations 372 according to a DRX cycle periodicity/length 375; here the on durations 371 define wake-up occasions.

The DRX cycle 370 is implemented by switching the low-power receiver 1352 between the active state 383 and the inactive state 384 (dashed line in FIG. 11).

The various states 381-384 are examples only. For illustration, it would be possible that the main receiver is not transitioned into the fully inactive state 384 when in DRX connected mode 302; rather, in the OFF durations 372, an intermediate state between 381 and 384 could be assumed.

Figure 12:
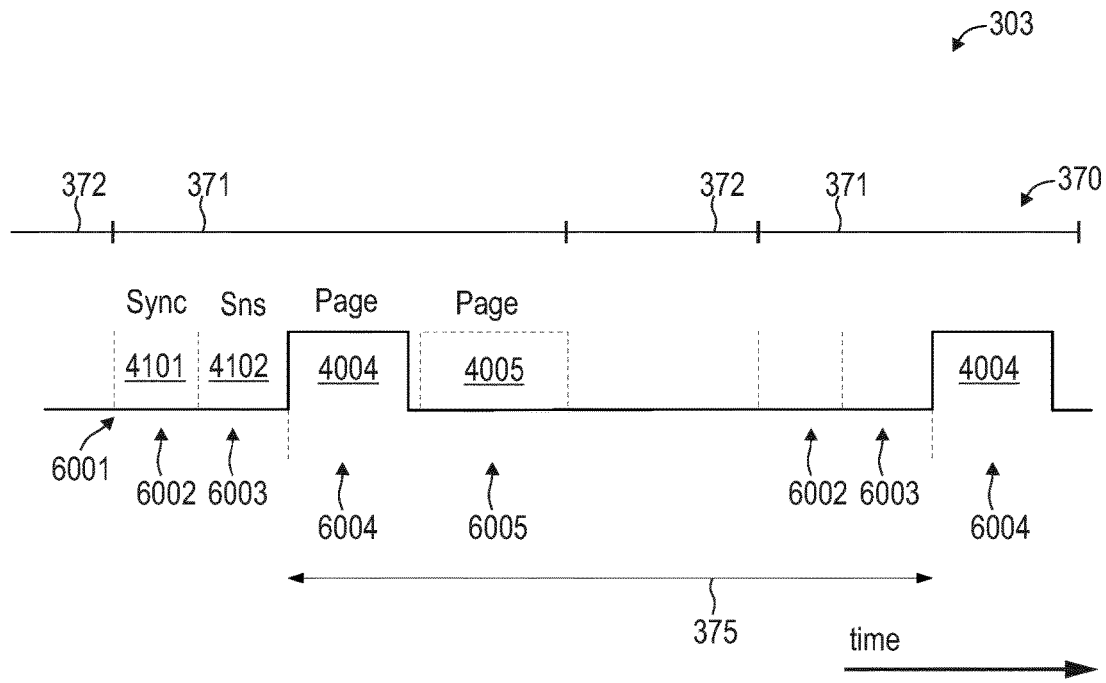
FIG. 12 schematically illustrates paging of the UE according to various examples.

FIG. 12 illustrates aspects with respect to operating the UE in idle mode 303. Specifically, FIG. 12 illustrates aspects with respect to listening for a paging signal 4004 and a paging message 4005. FIG. 12 also illustrates aspects with respect to synchronizing the UE 102 and the BS 101 and performing channel sensing, according to reference implementations.

At 6001, the off duration 372 expires and the on duration 371 begins. At this point, the receiver 1351 of the UE 102 is transitioned into the active state 382 in which it is fit to receive a paging signal 4004 (cf. FIG. 11). Prior to receiving the paging signal 4004, however, the UE 102, via the receiver 1351, receives a synchronization signal at 6002. Based on the synchronization signal, it is possible to synchronize the BS 101 and the UE 102, both, in time domain and frequency domain.

Next, at 6003, a reference signal 4102—sometimes also referred to as pilot signal or channel reference signal (CRS)—is received. Based on the reference signal 4102, channel sensing can be performed. The channel sensing facilitates measurement of the communication reliability on a channel between the BS 101 and the UE 102. If the reliability of communicating on the channel between the UE 102 and the BS 101 is sufficient, then, at 6004, a paging signal 4004 may be received. The paging signal 4004 may include an indicator associated with the UE 102; then, a paging message 4005 may be received at 6005. In the scenario of FIG. 12, the particular UE 102 is not paged at 6004 such that the paging message 4005 is not received. Thus, the receiver 1351 is again transitioned into the inactive state 384 during the following off duration 372. Blind decoding on the PDSCH for receiving the paging message 4005 is not required.

Figure 13:
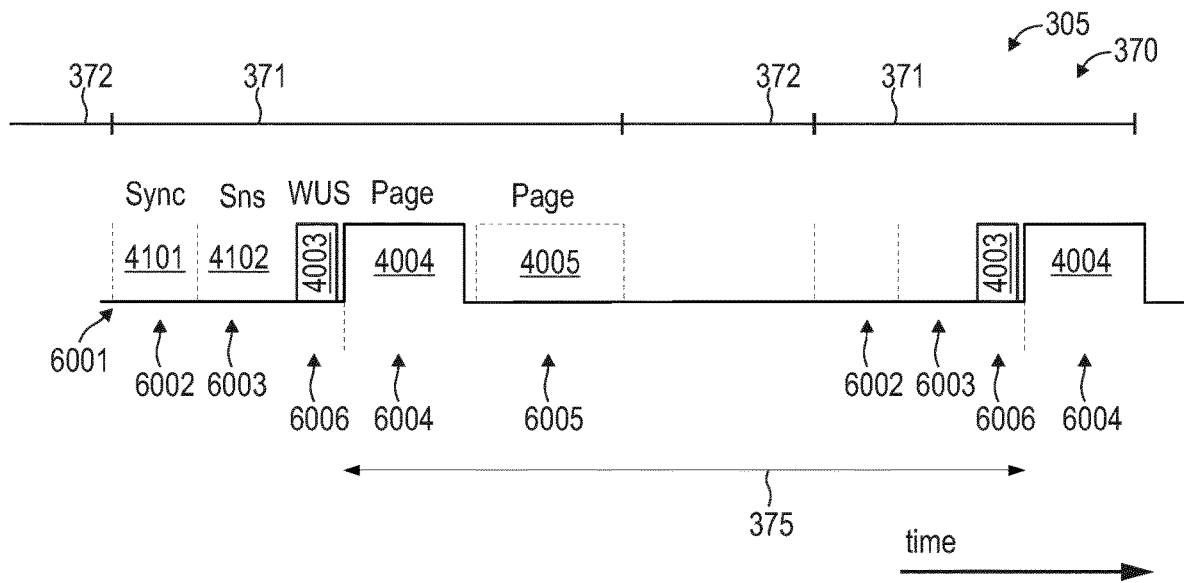
FIG. 13 schematically illustrates paging of the UE using a WUS according to various examples.

FIG. 13 illustrates aspects with respect to operating the UE in idle mode 305. Specifically, FIG. 13 illustrates aspects with respect to listening for a WUS 4003, a paging signal 4004, and a paging message 4005. FIG. 13 also illustrates aspects with respect to synchronizing the UE 102 and the BS 101 and with respect to channel sensing.

The scenario of FIG. 13 generally corresponds to the scenario of FIG. 12. However, in the scenario of FIG. 13, prior to receiving the paging signal 4004 at 6004, a WUS 4003 is received at 6006. The WUS 4003 is communicated time-aligned with the DRX 370. For being able to receive the WUS at 6006, at 6002, the synchronization signal 4101 broadcasted by the BS 101 is received and, at 6003, the reference signal 4102 broadcasted by the BS 101 is received.

The WUS 4003 is indicative of the PO associated with the paging signal 4004. Thus, when receiving the WUS 4003, the UE 102 may be informed to subsequently attempt receiving the paging signal 4004 at the respective PO. Details of the association between the WUS 4003 and the POs are illustrated in connection with FIG. 14.

Figure 14:
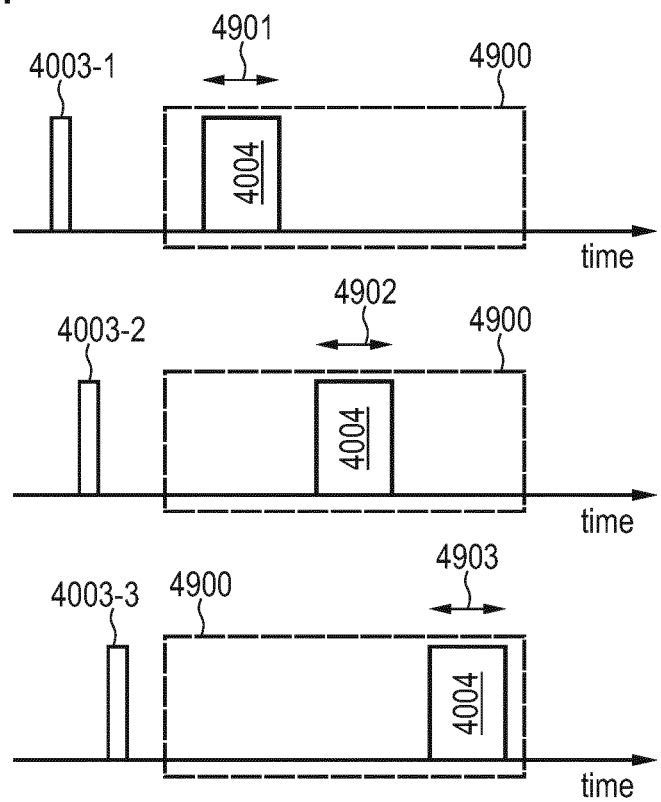
FIG. 14 schematically illustrates associations between WUSs and paging occasions, according to reference implementations.

FIG. 14 illustrates aspects with respect to communicating a plurality of WUS 4003-1, 4003-2, 4003-3, according to reference implementations. The various WUS 4003-1, 4003-2, 4003-3 are communicated in accordance with a wake-up occasion; the wake-up occasion may be time aligned with the DRX cycle 370.

In the scenario of FIG. 14, different WUS 4003-1-4003-3 are associated with different POs 4901, 4902, 4903. For, example WUS 4003-1 is associated with PO 4901; WUS 4003-2 is associated with PO 4902; and WUS 4003-3 is associated with PO 4903.

The POs 4901-4903 are included in a paging frame 4900. A paging frame 4900 may allocate a set of resources 202 on the respective control channel. Typically, the transmission protocol employs radio frames. For example, a radio frame may include multiple subframes. The radio frame may have a duration of between 5 ms and 50 ms, typically 10 ms. In a sequence of radio frames, POs 4901-4903 may be provisioned, e.g., in only some of the radio frames. These radio frames are typically referred to as paging frames. As illustrated in FIG. 14, there can be multiple POs 4901-4903 per paging frame 4900.

In FIG. 14, for each PO 4901, 4902, 4903, a respective wake-up occasion and a respective WUS 4003-1, 4003-2, 4003-3 is required. Hence, the reference implementation of FIG. 14 is resource inefficient: The number of WUSs scales with the number of POs. Thus, generally, there is a tendency that the number of WUS strongly increases for an increasing number of UEs. According to examples, such drawbacks are mitigated. According to examples, a single WUS may be associated with a plurality of POs. Such a scenario is illustrated in FIG. 15.

Figure 15:
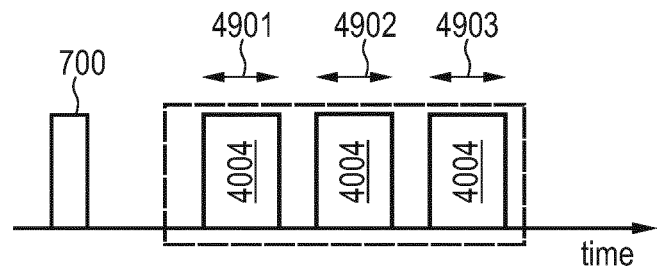
FIG. 15 schematically illustrates associations between a single WUS and multiple paging occasions, according to various examples.

FIG. 15 illustrates aspects with respect to communicating a WUS 700. The WUS 700 is associated with a plurality of POs 4901, 4902, 4903. The WUS 700 may be transmitted by the BS 101 and may be received by the UE 102. Different POs 4901, 4902, 4903 may be associated with different UEs. Generally, each PO may be associated with paging of one UE or a group of UEs.

In FIG. 15, the POs 4901, 4902, 4903 are offset in time domain. In the various scenarios described herein, different multiplexing techniques may be implemented with respect to the POs, e.g., offsetting multiple POs time domain and/or code domain and/or frequency domain. Thereby, different UEs associated with different POs can be addressed individually.

In the example of FIG. 15, the BS 101 then transmits paging signals 4004 in all POs 4901, 4902, 4903. Generally, it is not required that a paging signal 4004 is transmitted in each PO 4901, 4902, 4903 with which the WUS 700 is associated. For example, depending on whether downlink data is queued for transmission or not, a paging signal 4004 may be transmitted or not transmitted.

The different POs 4901-4903 may provide for a POs of different UEs. Hence, by means of the single WUS 700, it is possible to implement paging of a plurality of UEs. Hence, the WUS can be shared among multiple UEs. The multiple UEs can be divided into groups, each group being associated with a respective PO. This reduces control signaling overhead.

There are various options available for implementing the WUS 700. Such options are described with respect to FIGS. 16-21.

Figure 16:
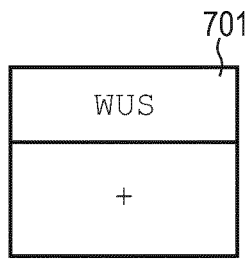
FIG. 16 schematically illustrates a WUS indicative of a plurality of paging occasions according to various examples.

FIG. 16 illustrates aspects with respect to an example implementation of a WUS 701. The WUS 701 is associated with a plurality of POs. The WUS 701 does not explicitly indicate each one of the plurality of POs with which is associated. The WUS 701 also does not explicitly indicate the various UEs that may be paged through the plurality of POs. Rather, the WUS is indicative only of the subsequent paging. Then, all relevant UEs may listen for paging signals at the relevant PO 4901-4903.

In one scenario, it would be possible that the WUS 701 is indicative of one or more paging frames in which the relevant POs 4901-4903 are provided (not shown in FIG. 16).

For example, in the various examples described herein, the particular PO 4901-4903 with which a UE is associated may be based on a formula; the formula may receive, as an input parameter, an identity of the UE or an identity of a subscriber associated with the UE, e.g., the International Mobile Subscriber Identity (IMSI). A further input parameter may be the frame number of the paging frame. Thus, by determining the frame number and using the IMSI, the UE can derive the timing of its own PO 4901-4903 after receiving the WUS 700.

In the scenario of FIG. 16, the control signaling overhead is low, because the WUS 701 is short. The WUS 701 may be generated from a UE-unspecific base sequence (cf. FIG. 7: block 2001). The base sequence may not discriminate between different POs. On the other hand, all UEs may need to listen for potential subsequent paging signals—even if, in fact, there will be no paging signal, e.g., due to lack of DL data. Ambiguities between multiple UEs associated with different POs are not resolved by the WUS 701. Thus, in some scenarios it may be desirable to tailor the trade-off situation between (i) control-signaling overhead and (ii) energy consumption at the UEs in favor of (ii). Such a scenario is illustrated in FIGS. 17-21.

Figure 17:
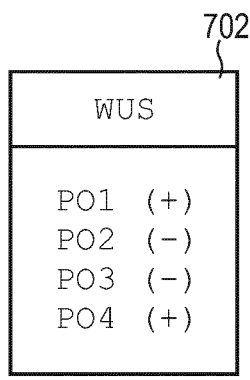
FIG. 17 schematically illustrates a WUS indicative of a plurality of paging occasions according to various examples.

FIG. 17 illustrates aspects with respect to an example implementation of a WUS 702. The WUS 702 is associated with a plurality of POs. The WUS 702 is indicative of the plurality of POs. Specifically, the WUS 702 indicates, for each one of the plurality of POs, whether a paging signal will be transmitted at the respective PO. Respective indicators may be included in the WUS 702. The WUS 702 may address one or more UEs. As illustrated in FIG. 17, there is a 1-to-N mapping between recipient(s) of the WUS 702 and POs.

Such an implementation reduces energy consumption, because, e.g., any UE associated with a non-paged PO may not be required to listen for a subsequent paging signal. Rather, the respective one or more non-paged UEs may transition their receivers 1351, 1352 to the inactive state 384 (e.g., in the example of FIG. 17 those UEs that are associated with POs "PO2" and "PO3". Ambiguities between whether there will be paging at a given PO may be pre-emptively resolved by the WUS 702.

Figure 18:
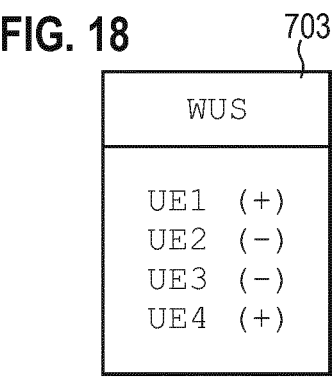
FIG. 18 schematically illustrates a WUS indicative of a plurality of paging occasions according to various examples.

FIG. 18 also illustrates aspects with respect to an example implementation of a WUS 703. The WUS 703 is associated with a plurality of POs. Instead of indicating the POs, the WUS 703 is indicative of the plurality of UEs. The WUS 703 may include respective indicators, e.g., indicative of unique identifiers of the various UEs.

A scenario according to the example of FIG. 18 may be helpful where a fixed and predefined mapping between UEs and POs exists. For example, the PO may be derived from an identity of the respective UE, according to a predefined rule. For example, the time-frequency position of the PO may be predefined—differently, for different UEs—with respect to the time-frequency position of the WUS 703.

Figure 19:
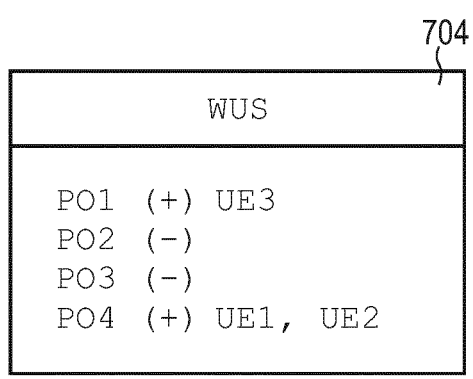
FIG. 19 schematically illustrates a WUS indicative of a plurality of paging occasions according to various examples.

FIG. 19 illustrates aspects with respect to a further example implementation of a WUS 704. The WUS 704 is indicative of, both, a plurality of POs, as well as of a plurality of UEs. Specifically, the WUS 704 is indicative of a mapping between the plurality of POs and the plurality of UEs. For example, a multi-bit indicator—e.g., configured as a bitmap indicator—could be used. Here, different entries of the bitmap indicator may correspond to different POs; and may be indicative of the respectively associated UEs.

For example, such a multi-bit indicator could be encoded as a bit sequence. Here, different entries of a corresponding bitmap may relate to different POs or, alternatively, to different UEs. The length of each entry of the bitmap may vary; entry delimitations may be used. This has the effect that the mapping is versatile. As such, the multi-bit indicator may be included in a payload section.

In alternative examples, it would also be possible to use predefined base sequences—or generally any other bit sequence to be included in the WUS—that define the multi-bit indicator (cf. FIGS. 7 and 8). As such, there may be a plurality of candidate bit sequences available to select from; each candidate bit sequence may be predefined and pre-associated with a certain mapping. This is illustrated by the following table

TABLE 1

Value of bit sequence depending on mapping between POs and UEs

| UE4 | 13 | 14 | 15 | 16 |
| UE3 | 9 | 10 | 11 | 12 |
| UE2 | 5 | 6 | 7 | 8 |
| UE1 | 1 | 2 | 3 | 4 |
|  | PO1 | PO2 | PO3 | PO4 |

From Table 1, it can be seen, e.g., that: If the WUS is non-UE specific, the WUS includes index 0; If the WUS indicates subsequent paging of UE1 or UE group 1 at PO1, then the WUS includes index 1; If the WUS indicates subsequent paging of UE1 or UE group 1 at PO 4, the WUS includes index 4; and If the WUS indicates subsequent paging of UE1 or UE group 1 at PO1 and further indicates subsequent paging of UE4 or UE group 4 at PO4, then the WUS includes index 16, i.e. 1+16.

Hence, generally, the base sequence may encode the mapping between POs and UEs according to some pre-defined rule. Instead of mapping such a multi-bit indicator to the base sequence, generally, the multi-bit indicator could be mapped to any bit sequence to be included in the WUS 704.

Using such techniques of encoding the mapping onto a bit sequence, a shorter WUS 704 may be achieved; but there may only be a limited count of predefined mappings available to select from.

In other examples, the bitmap may implement a 2-D array; each entry of the array may be associated with a respective UE and an associated PO. For example, using such a 2-D array approach the WUS 704 could be implemented as follows: [0;0;1;0];[0;0;0;0];[0;0;0;0];[1;1;0;0]. Here, the first row corresponds to "PO1"; in "PO1", only "UE3" will be paged via paging signal, hence only the third entry is marked with a "1" and the entries corresponding to "UE1", "UE2", and "UE3" are marked with a "0". The second row corresponds to "PO2"; the third row corresponds to "PO3". Neither of them are utilized for transmitting paging signals to any UE, hence all entries are "0". The third row corresponds to "PO4"; here "UE1" and "UE2" will be paged, hence the first and second entries are "1".

Such a scenario in which the WUS 704 is indicative of the mapping between POs and UEs facilitates flexible reassignment of associations between POs and UEs. This may be desirable, e.g., in connection with traffic shaping.

In the examples of FIGS. 16-19, the WUS 701-704 are not indicative of the particular time-frequency position of the respective POs. Rather, the time-frequency positions may be at least partly predefined, e.g., parameterized based on a UE identity. However, such examples of FIGS. 16-19 may be readily combined with scenarios in which the WUS 705 is also indicative of a time position and/or a frequency position of the various POs. Such examples are illustrated in connection with FIGS. 20 and 21.

Figure 20:
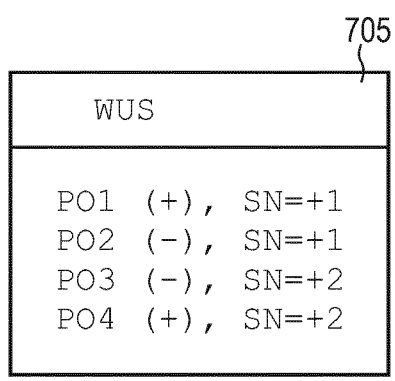
FIG. 20 schematically illustrates a WUS indicative of a plurality of paging occasions according to various examples.

FIG. 20 illustrates aspects with respect to a further example implementation of a WUS 705. The WUS 705 is indicative of the plurality of POs; but, generally, could also be indicative of the plurality of UEs (cf. FIG. 19). In the example of FIG. 20, the WUS 705 is indicative of the radio frame including the respective POs. Hence, the WUS 705 is indicative of the time position at a comparably low resolution. Such a scenario may be helpful in order to address paging of UEs spread out across multiple paging frames. This helps to provide POs for a large count of UEs.

For example, different radio frames/paging frames could be addressed by means of the sequence numbers, e.g., define relatively or in absolute terms.

Figure 21:
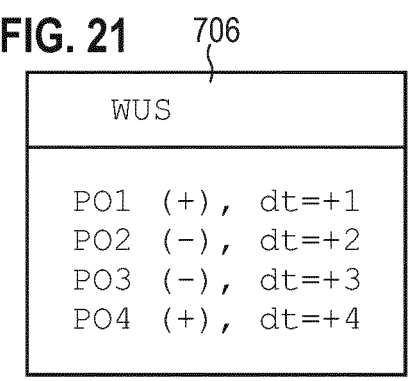
FIG. 21 schematically illustrates a WUS indicative of a plurality of paging occasions according to various examples.

FIG. 21 illustrates aspects with respect to a still further example implementation of a WUS 706. The WUS 706 is indicative of the plurality of POs; but, generally, could also be indicative of the plurality of UEs (cf FIG. 19). In the example of FIG. 20, the WUS 706 is indicative of the time position of the respective PO, relatively defined with respect to the time position of the WUS 706 or in other reference point in time. Alternatively or additionally, the WUS 706 could also be indicative of the frequency position of the respective PO, relatively defined with respect to the frequency position of the WUS 706 or with respect to a different reference frequency. Generally, the WUS 706 could be indicative of a time-frequency position of the respective PO.

Thereby, flexible allocation of resource elements in a time-frequency resource grid for POs becomes possible. This facilitates high spectrum utilization, specifically in scenarios where a large count of UEs potentially needs to be paged.

Figure 22A:
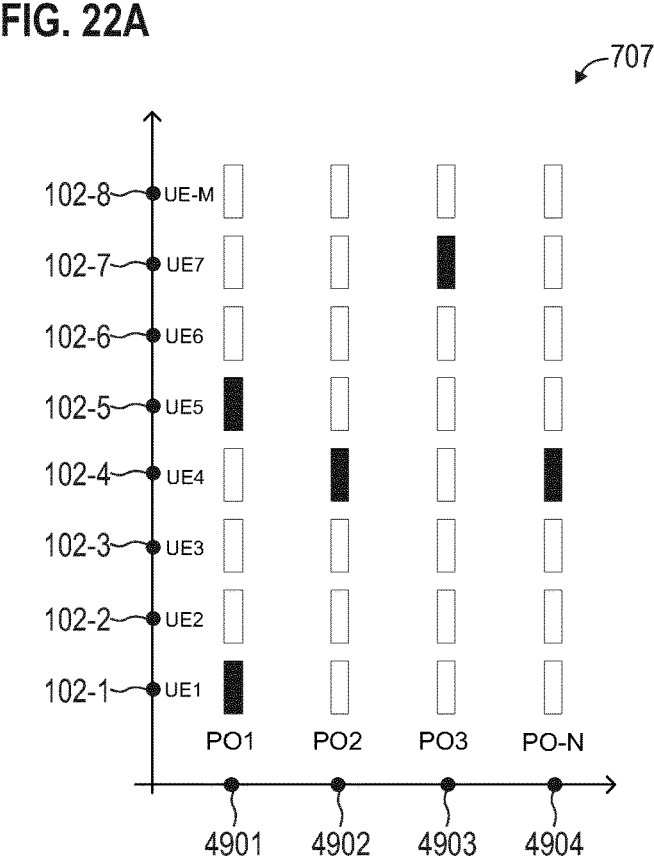
FIG. 22A illustrates a WUS indicative of a plurality of paging occasions according to various examples.

FIG. 22A illustrates aspects with respect to a further example implementation of a WUS 707. The WUS 707 includes a multi-bit bitmap indicator indicative of a mapping between UEs 102-1-102-8 and POs 4901-4904. Specifically, for each PO 4901-4904, one UE or a group of UEs 102-1-102-8 may be referred to.

As illustrated in FIG. 22A, the bitmap indicator is indicative of the PO 4901 being associated with the UEs 102-1 and 102-5. Generally, it is possible that at least some of the POs 4901-4904 are for paging of a respective UE group, typically including more than a single UE. For example, ambiguities between the different UEs of the UE group can be resolved by means of the paging signal 4004 or even the paging message 4005.

The bitmap indicator is then indicative of the PO 4902 being associated with the UE 102-4; the PO 4903 being associated with the UE 102-7; and the PO 4904 being associated with the UE 102-4. Thereby, the respective UEs 102-1, 102-4, 102-5, and 102-7 can be flexibly paged using different POs.

Figure 22B:
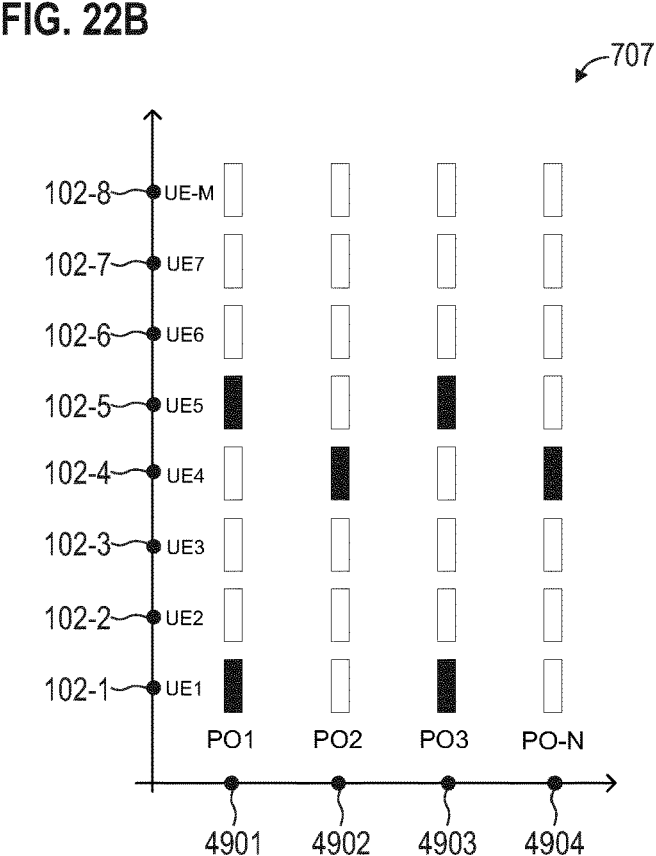
FIG. 22B illustrates a WUS indicative of a plurality of paging occasions according to various examples.

With respect to the UE 102-4 being associated with, both, the PO 4902 and 4904: such redundant paging may help to increase reliability of successful paging; generally, at least some of the different POs may be associated with different UEs, but this is not mandatory. This 1-to-N mapping between UE 102-4 and POs 4902, 4904 is generally applicable for the various examples described herein, even where the WUS 707 does not include a multi-bit bitmap indicator as in FIG. 22A (e.g., for a WUS 702 as described in FIG. 17). For instance, a respective scenario is illustrated in FIG. 22B. FIG. 22B generally corresponds to the scenario of FIG. 22A. However, in the scenario of FIG. 22B, there is a 1-to-N mapping for each one of the UEs 102-1, 102-5, i.e., with POs 4901, 4903. The UEs 102-1, 102-5 may form a group.

Figure 23:
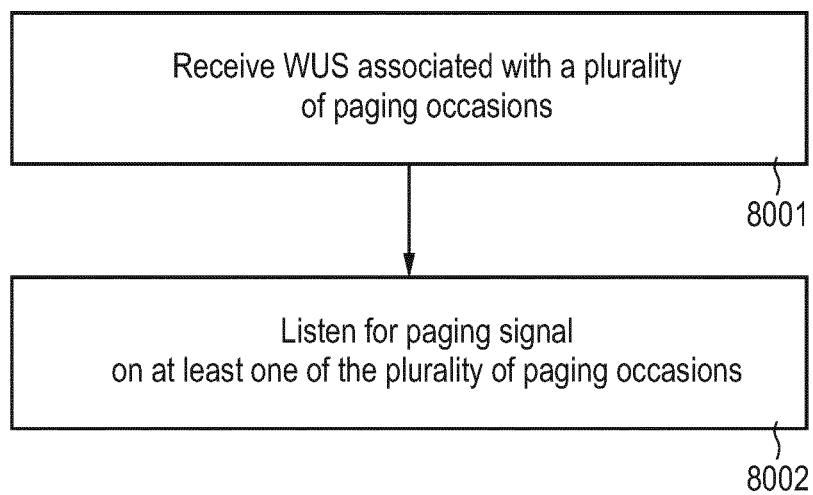
FIG. 23 is a flowchart of a method according to various examples.

FIG. 23 is a flowchart of a method according to various examples. The method of FIG. 23 may be executed by a UE. For example, the method according to FIG. 23 may be executed by the control circuitry 1022 of the UE 102.

At block 8001, a WUS is received. The WUS is associated with a plurality of POs. Each one of the plurality of POs may be associated with one or more UEs. I.e., for illustration the plurality of POs may be associated with a single given UE or with multiple UEs, e.g. a UE group. For instance, the WUS may be directed to a single given UE or to multiple UEs.

Next, at block 8002, based on the WUS, listening for a paging signal on a least one of the plurality of POs is implemented. For instance, the UE may listen for the WUS at multiple POs, to create redundancy in the paging. For example, the respective at least one PO may be selected from the plurality of POs based on information included in the WUS; alternatively or additionally, the at least one PO may be selected from the plurality of POs based on predefined information, e.g., a predefined mapping between a UE identity and POs.

Figure 24:
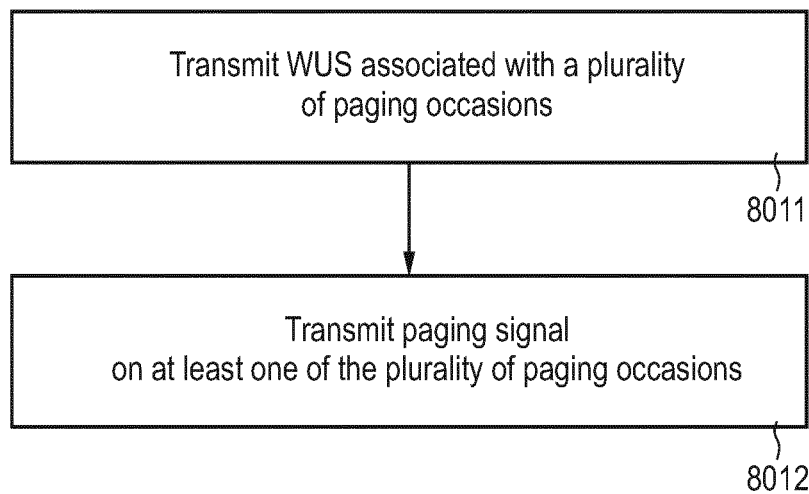
FIG. 24 is a flowchart of a method according to various examples.

FIG. 24 is a flowchart of a method according to various examples. For example, the method according to FIG. 24 may be executed by the control circuitry 1012 of the BS 101.

At block 8011, a WUS is transmitted. The WUS is associated with a plurality of POs. Each one of the plurality of POs may be associated with a plurality of UEs. Block 8011 is inter-related to block 8001.

Next, at block 8012, one or more paging signals are transmitted on at least one of the plurality of POs. For example, paging signals may be transmitted on one or more POs as indicated by the WUS; it would also be possible that the specific POs of the plurality of POs with which the WUS is associated and on which a paging signal is transmitted at block 8012 are not indicated by the WUS.

Summarizing, above techniques have been described which enable sharing of a WUS between multiple UEs. In particular, it is possible that the WUS is indicative of a plurality of POs associate with the multiple UEs.

A WUS can include information indicative of one or more target groups of UEs. Hence, the UE(s) that detects this WUS and belongs to one of the indicated groups in the group information will "wake up" and attempt to decode its related paging occasion(s).

The group indicator could as one typical example be indicative of one or more of the upcoming POs. With this method only a single WUS would be required to be transmitted even with multiple POs, e.g., for one or more UEs, per paging frame. The number of indicator bits required to point out which ones of the groups or POs there is an upcoming pointer for may be determined by the total number of groups.

Other indication possibilities could also be considered with the target group concept. One generic WUS grouping method could e.g. be to define that the indicator is set if any paging at all is performed for any UE, e.g., given certain upcoming POs and/or given a multiple of upcoming paging frames. The indicator could, in such case, indicate in which of the upcoming frames there is a paging.

To group UEs to use the same WUS, it would be possible to assign one WUS to be valid for multiple radio frames, thereby covering multiple paging frames. In such example there could be a large number of UEs that are grouped together and their POs occur during multiple radio frames. The WUS may include a mapping pointer to which ones of the related radio frames there actually is a page for any of the UEs configured to those paging occasions. Alternatively or additionally, paging could be done within the paging occasions in the normal manner for UEs that are not configured to listen for WUS, e.g., smartphones or other UEs with frequent paging.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while above various examples have been described in which multiple POs that are addressed by a WUS are associated with multiple UEs, it would even be possible that a WUS is UE specific for a given UE and still addresses multiple POs for that given UE. In other words, there can be a 1-to-N mapping for the given UE and POs. This helps to create redundancy in the paging, thereby increasing reliability.

The invention claimed is:

1. A method of operating a terminal, comprising:
receiving a wake-up signal associated with a plurality of paging occasions for a plurality of terminals, each one of the plurality of paging occasions being associated with one or more of the plurality of terminals, and
in response to said receiving of the wake-up signal:
listening for a paging signal at at least one paging occasion of the plurality of paging occasions,
wherein a time-frequency position of the paging occasions with respect to a time-frequency position of the wake-up signal is differently predefined for different terminals.

2. The method of claim 1,
wherein the wake-up signal is indicative of the plurality of paging occasions.

3. The method of claim 2,
wherein the wake-up signal is, for each one of the plurality of paging occasions, indicative of a time-frequency position associated with the wake-up signal.

4. The method of claim 1,
wherein the wake-up signal is indicative of at least one radio frame including the plurality of paging occasions.

5. The method of claim 1,
wherein time-frequency positions of the plurality of paging occasions are at least partly predefined.

6. The method of claim 1,
wherein the wake-up signal includes a bitmap indicator, each entry of the bitmap indicator being associated with one of the plurality of paging occasions and at least one of the plurality of terminals.

7. The method of claim 1,
wherein the wake-up signal is indicative of a mapping between the plurality of paging occasions and the plurality of terminals.

8. The method of claim 7,
wherein wake-up signal includes a bitmap indicator indicative of the mapping; or
wherein the wake-up signal includes a bit sequence selected from a plurality of predefined candidate bit sequences, each candidate bit sequence being associated with a respective mapping between the plurality of paging occasions and the plurality of terminals.

9. The method of claim 1,
wherein the wake-up signal is generated from a terminal-unspecific base sequence.

10. The method of claim 1,
wherein the plurality of paging occasions are offset in at least one of time domain, frequency domain, and code domain.

11. The method of claim 1,
wherein the wake-up signal is indicative of the plurality of terminals.

12. The method of claim 1,
wherein at least some of the plurality of paging occasions are for a paging of a respective terminal group comprising one or more terminals of the plurality of terminals.

13. A method of operating a base station, comprising:
transmitting a wake-up signal associated with a plurality of paging occasions for a plurality of terminals, each one of the plurality of paging occasions being associated with one or more of the plurality of terminals, and
transmitting at least one paging signal on at least one of the plurality of paging occasions for at least one of the plurality of terminals,
wherein a time-frequency position of the paging occasions with respect to a time-frequency position of the wake-up signal is differently predefined for different terminals.

14. A terminal comprising control circuitry configured to perform:
receiving a wake-up signal associated with a plurality of paging occasions for a plurality of terminals, each one of the plurality of paging occasions being associated with one or more of the plurality of terminals, and
in response to said receiving of the wake-up signal: listening for a paging signal at at least one paging occasion of the plurality of paging occasions,
wherein a time-frequency position of the paging occasions with respect to a time-frequency position of the wake-up signal is differently predefined for different terminals.

15. A base station comprising control circuitry configured to perform:
transmitting a wake-up signal associated with a plurality of paging occasions for a plurality of terminals, each one of the plurality of paging occasions being associated with one or more of the plurality of terminals, and
transmitting at least one paging signal on at least one of the plurality of paging occasions for at least one of the plurality of terminals,
wherein a time-frequency position of the paging occasions with respect to a time-frequency position of the wake-up signal is differently predefined for different terminals.

* * * * *